(12) United States Patent
Godfrey et al.

(10) Patent No.: US 6,390,722 B1
(45) Date of Patent: May 21, 2002

(54) RELEASE LINK FOR INTERCONNECTED CABLES

(75) Inventors: Daniel M. Godfrey, North Kingstown; Gary R. Berlam, Warwick, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/685,145

(22) Filed: Oct. 11, 2000

(51) Int. Cl.[7] .............................. F16B 21/00; B25G 3/18
(52) U.S. Cl. .................... 403/322.2; 403/321; 403/325; 403/DIG. 3; 294/82.28
(58) Field of Search ............................... 403/322.1, 321, 403/325, DIG. 3; 114/377; 294/82.28, 82.25

(56) References Cited

U.S. PATENT DOCUMENTS

| | | | | |
|---|---|---|---|---|
| 1,197,117 A | * | 9/1916 | Fried ........................... 24/635 |
| 2,562,459 A | * | 7/1951 | Hoey ...................... 294/82.28 |
| 2,693,980 A | * | 11/1954 | Heidman, Jr. ............ 294/82.28 |
| 2,729,495 A | * | 1/1956 | Dejean ..................... 294/82.28 |
| 2,837,370 A | * | 6/1958 | Scott et al. ............... 294/82.28 |
| 3,444,773 A | * | 5/1969 | Ligne ......................... 411/390 |
| 3,693,484 A | * | 9/1972 | Sanderson, Jr. ......... 403/325 X |
| 3,829,146 A | * | 8/1974 | Laswell et al. ........... 294/82.25 |
| 4,318,630 A | * | 3/1982 | Herchenbach et al. ... 403/322.2 |
| 4,453,449 A | * | 6/1984 | Hollmann ............ 403/322.2 X |
| 4,619,424 A | * | 10/1986 | Twardawa et al. ... 294/82.28 X |
| 4,900,181 A | * | 2/1990 | Geisthoff ................. 403/322.2 |
| 5,265,970 A | * | 11/1993 | LaBarre .................... 403/322.2 |

* cited by examiner

Primary Examiner—Lynne H. Browne
Assistant Examiner—Ernesto Garcia
(74) Attorney, Agent, or Firm—Michael J. McGowan; James M. Kasischke; Prithvi C. Lall

(57) ABSTRACT

A release link for interconnecting first and second cables, includes a cylinder having an open first end and an aperture through a second end, a collar fixed to the cylinder first end, and having an annular internal flange, and a guide washer slidably disposed in the collar second end. The link further includes a piston extending through the cylinder aperture and through the guide washer, the piston including a neck portion and a head portion disposed at a first end of the piston. A cap is connectable to the collar. Balls are adapted to be disposed adjacent the piston neck portion and radially adjacent the collar internal flange. A spring is disposed in the cylinder and biases the guide washer toward the balls. A first connector is on the cap for attachment to the first cable, and a second connector is on a second end of the piston for attachment to the second cable. Tension on the cables exceeding the bias of the spring is operative to move the guide washer and the piston, to move the balls from radial adjacency to the collar internal flange, to permit the piston to disengage from the cylinder.

16 Claims, 4 Drawing Sheets ly known. One known type
RELEASE LINK FOR INTERCONNECTED CABLES

STATEMENT OF GOVERNMENT INTEREST

The invention described herein may be manufactured and used by or for the Government of the United States of America for Governmental purposes without the payment of any royalties thereon or therefor.

CROSS-REFERENCE TO RELATED APPLICATIONS

This patent application is co-pending with a related patent application entitled "Assembly For Connecting Together Separated Portions Of A Cable Release Link" (Navy Case 77375), filed concurrently herewith, in the names of the inventors herein.

BACKGROUND OF THE INVENTION (1) Field of the Invention

The invention relates to links for interconnecting cables and is directed more particularly to a link for interconnecting the cables and releasing the cables from interconnection upon tension in the cables reaching a preselected release force.

(2) Description of the Prior Art

Release couplings are generally known. One known type of coupling includes a release link, a steel pin attached at one end to the release link, and a jaw having a recess into which the other end of the pin normally resides. A first cable is attached to the pin and a second cable is attached to the link. Tension in the cables can exert a force on the pin sufficient to cause the jaw to spread enough to allow the-pin to escape therefrom which, in turn, allows the cables to disengage from one another.

An adjustment sleeve is provided which slides along the jaw to vary the stiffness thereof, and thereby vary the release force required to activate release.

Such mechanisms are calibrated by repeatedly causing release to occur and measuring the force required. The procedure is tedious and time consuming, and has been found to be very sensitive to operator technique. Further, it has been found that release forces can change markedly within hours after calibration. Even with very strict process controls, it has been demonstrated that any given,release link can vary in release force by over 10% on consecutive pulls. Factors which affect the release force include surface finish quality on the pin and/or jaw, grease on an operator's fingers, and time between releases.

There is a need for a release link which is more reliable and predictable with respect to release force, and which requires less time consuming adjustment procedures.

SUMMARY OF THE INVENTION

It is, therefore, an object of the invention, to provide a release link having a predictable and consistent release mechanism and a less time consuming adjustment facility.

With the above and other objects in view, as will hereinafter appear, a feature of the present invention is the provision of a release link for interconnecting first and second cables, the link comprising a cylinder having an open first end and an aperture through a second end, a collar having a first end, a second end fixed to the cylinder first end, and an annular internal flange, and a guide washer slidably disposed in the collar second end. The link further comprises a piston having a body portion extending through the cylinder aperture, a reduced diameter portion axially extending from the body portion and through the guide washer, a neck portion axially extending from the reduced diameter portion, and a tapered head portion. axially extending from the neck portion, the head portion being disposed at the first end of the piston and in the collar. A cap is connected to the collar first end. Balls are adapted to be disposed in the piston neck portion radially adjacent the collar internal flange. A spring is disposed in the cylinder biasing the guide washer toward the balls. A first connector is on the cap and is for attachment to the first cable, and a second connector is on a second end of the piston for attachment to the second cable. When tension on the cables exceeds the bias of the spring, the tension is operative to move the guide washer and the piston, to move the balls from radial adjacency to the collar internal flange, to permit the piston to disengage from the cylinder.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein corresponding reference characters indicate corresponding parts throughout the drawings, and wherein.

DESCRIPTION OF THE PREFERRED EMBODIMENT

Figure 1:
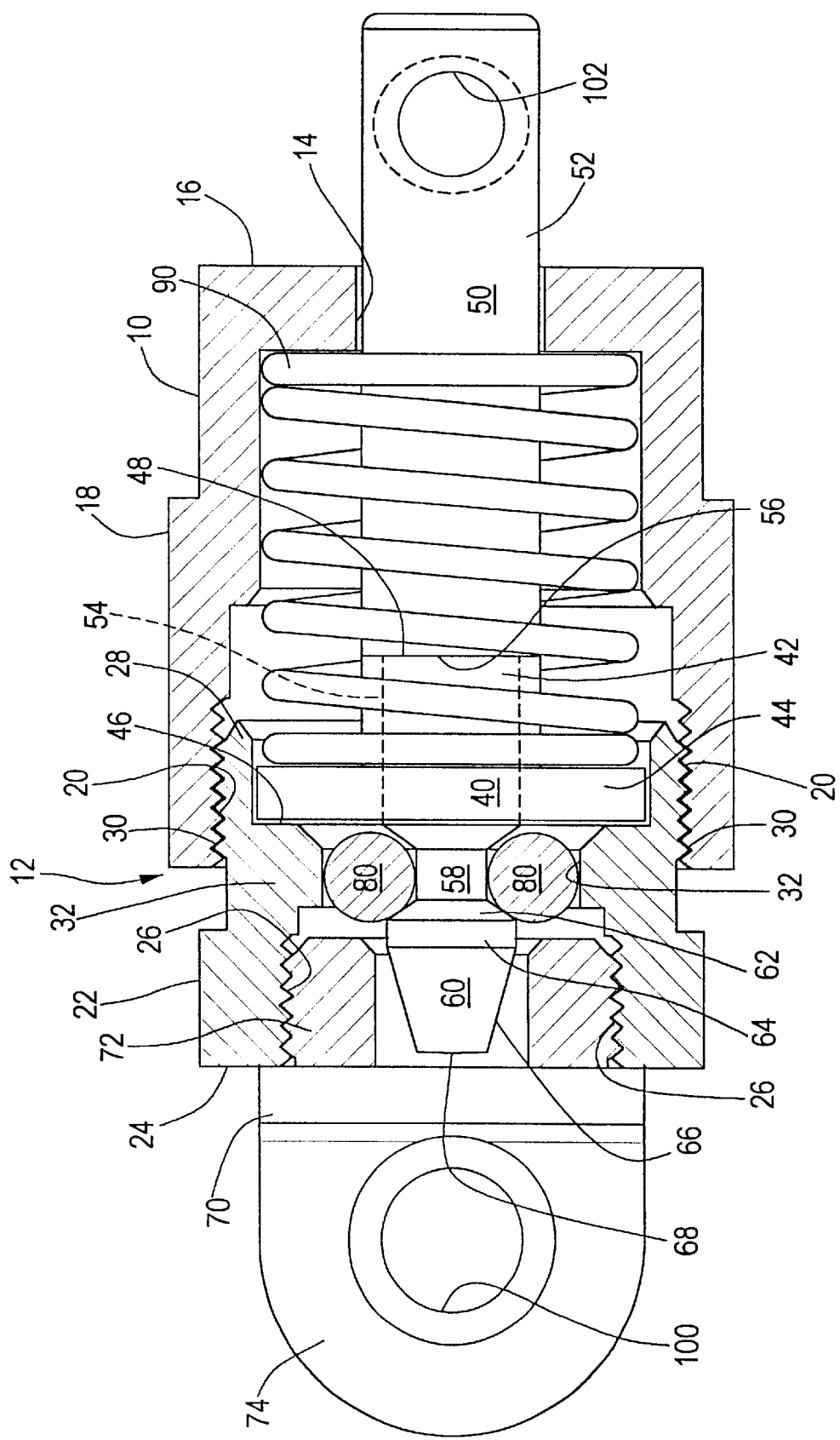
FIG. 1 is a partially sectional view of one form of release link illustrative of an embodiment of the invention, shown in a "lock" mode.
Figure 2:
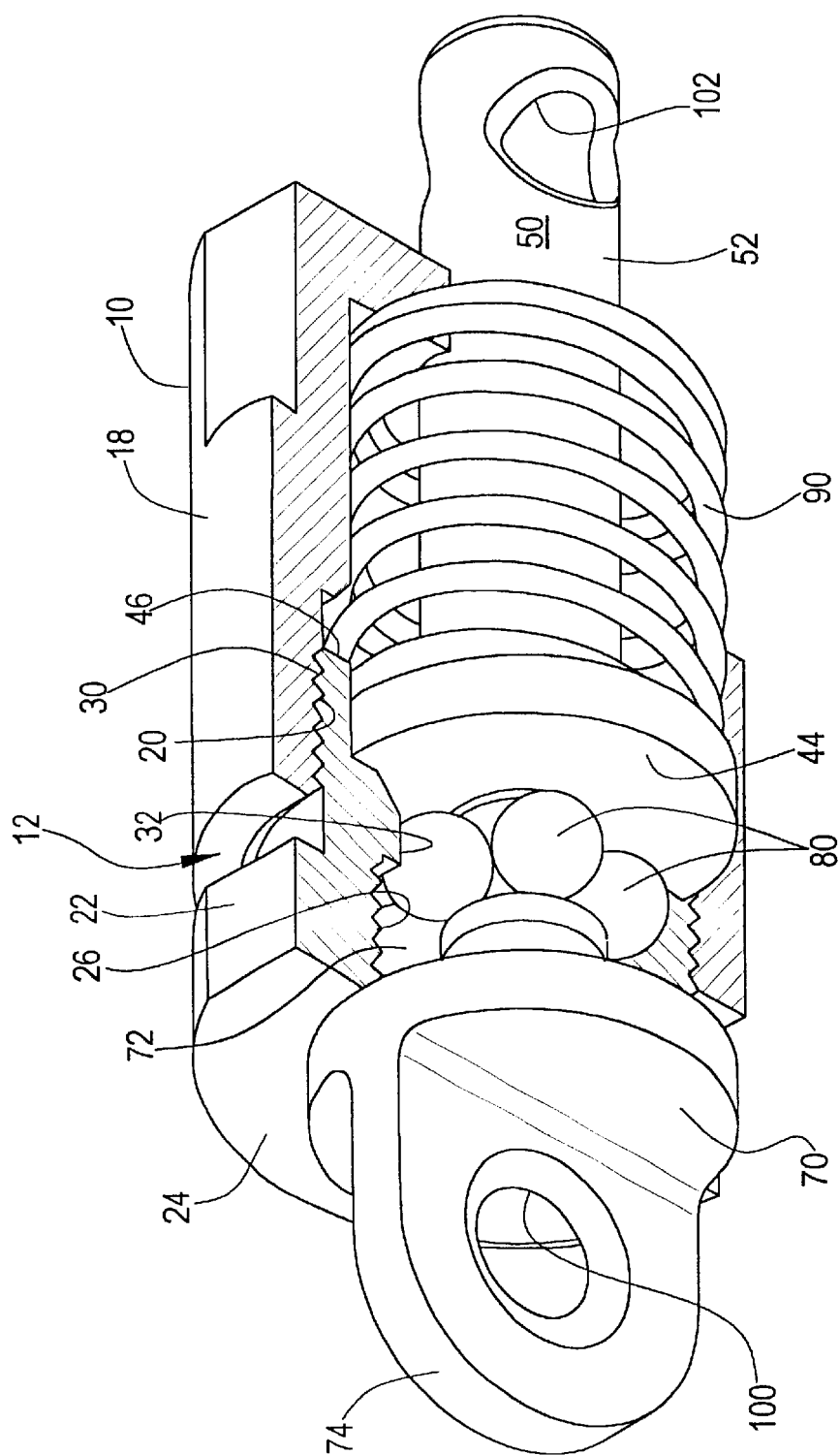
FIG. 2 is a perspective, broken-away, view of the release link of FIG. 1.

Referring to the drawings, it will be seen that an illustrative embodiment of the inventive release link includes a cylinder 10 having an open first end 12 and an aperture 14 through a second end 16. The cylinder 10 is provided with an enlarged diameter portion 18 which defines the first end 12 and which is provided with internal threads 20 adjacent the first end 12.

The illustrative link further includes a collar 22 having a first end 24 with internal threads 26, a second end 28 with external threads 30, and an annular internal flange 32 extending radially inwardly from the collar 22. Collar 22 second and 28 external threads 30 are engaged with the cylinder first end internal threads 20.

A guide washer 40 having a barrel portion 42 and an annular flange portion 44 is slidably disposed in the collar second end portion 28 and is positionable against an annular surface 46 of the collar internal flange 32.

A piston 50 includes a body portion 52 disposed in the cylinder 10 and extending through the aperture 14. The piston 50 further includes a reduced diameter portion 54 (FIGS. 1 and 3) axially extending from the body portion 52 and through the guide washer 40. The piston reduced diameter portion 54 forms a shoulder 56 (FIG. 1) which receives an annular edge 48 of the guide washer barrel portion 42. The piston 50 still further includes a neck portion 58 axially extending from the reduced diameter portion 54, and a head portion 60 axially extending from the neck portion 58.

The head portion 60 includes a proximal tapered outwardly extending surface 62 (FIGS. 1 and 3), a cylindrical band 64, a distal tapered inwardly extending surface 66, and an end surface 68.

A cap 70 with a threaded tubular portion 72 is threadedly connectable to the collar internal threads 26 and receives into the tubular portion 72 the piston head portion 60.

A plurality of balls 8b are adapted to be disposed adjacent the piston neck portion 58, the collar internal flange 32, the piston reduced diameter portion 54, and the surface 62 of head portion 60.

A spring 90 is disposed in the cylinder 10 between the cylinder second end 16 and the guide washer flange portion 44, and biases the guide washer toward the balls 80, or leftwardly as viewed in the drawings.

The cap 70 is provided with a flange 74 mounting a first connector 100 in the form of a hole in flange 74, as illustrated in the drawings, but which may be a ring or any suitable fastener for connecting the cap 70 to a first cable (not shown). Similarly, the piston body portion 52 is provided with a second connector 102, illustrated in the drawing as a hole in piston body portion 52, but which may be any suitable fastener for connecting the body portion 52 to a second cable (not shown).

Figure 3:
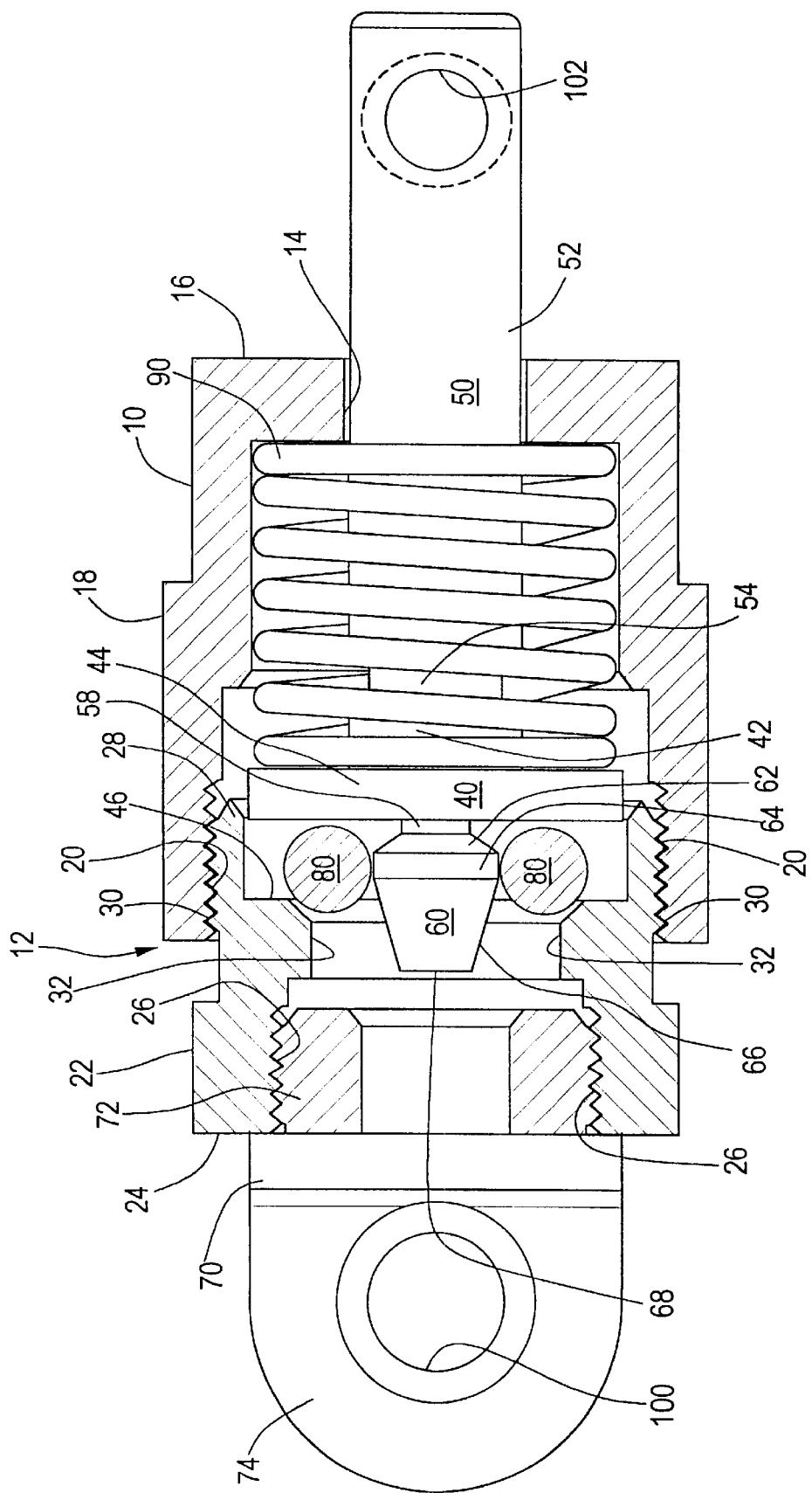
FIG. 3 is similar to FIG. 1, but showing the illustrative release link in a "release" mode.
Figure 4:
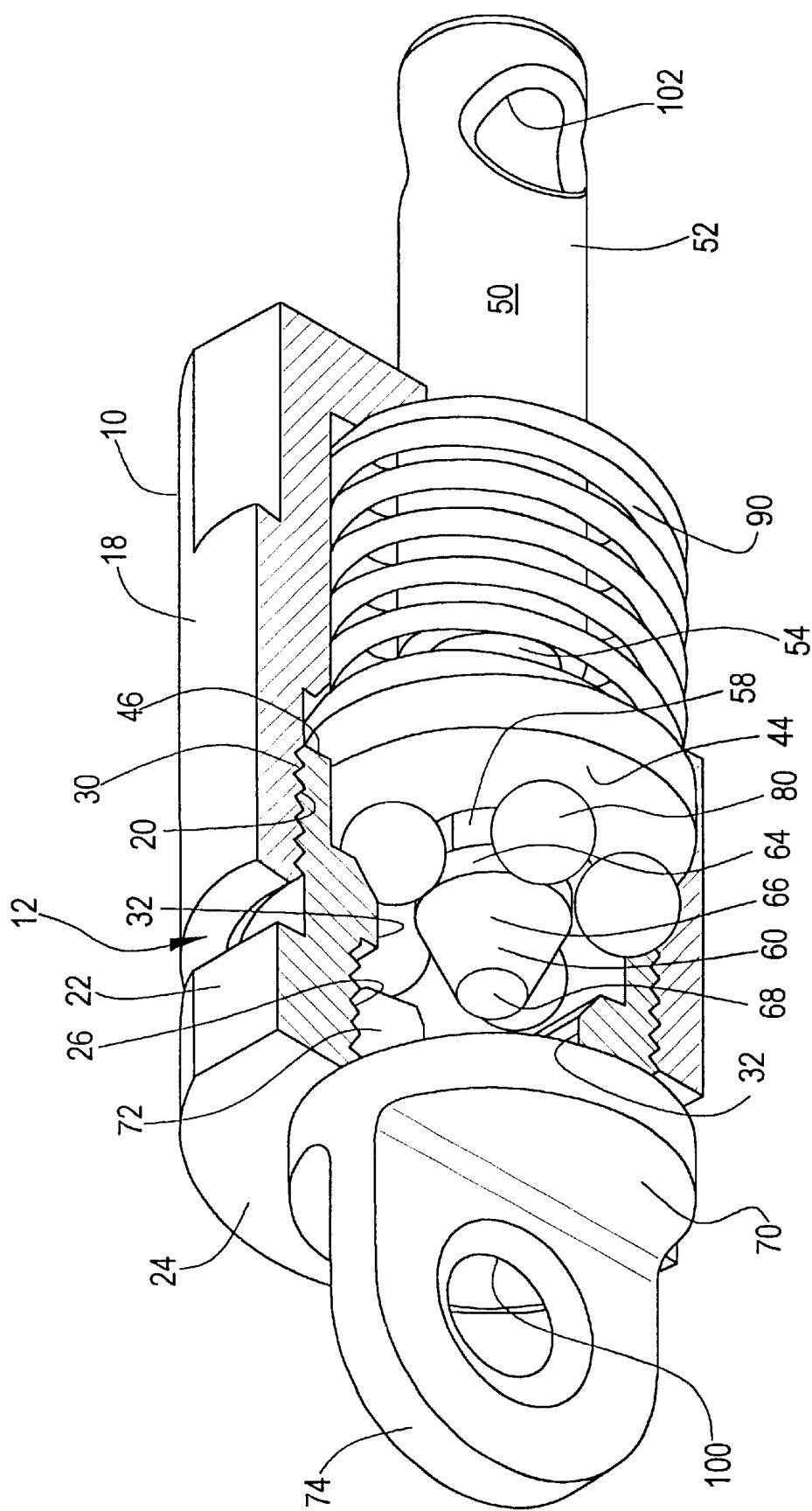
FIG. 4 is a perspective, broken-away, view of the release link of FIG. 3.

In operation, when the cap 70 and piston 50 are pulled in opposite directions away from each other, the piston 50, balls 80, and guide washer 40 are pulled toward the second end 16 of cylinder 10 against the bias of spring 90. In due course, as the spring bias is progressively overcome, the balls 80 are moved by the piston head portion 60 away from the position shown in FIG. 1, to a position, shown in FIG. 3, removed from the piston neck portion 58 and abutting the head portion cylindrical band 64 (FIG. 3). Such movement allows passage of the piston head portion 60 past the balls 80, and permits withdrawal of piston 50 from cylinder 10 through aperture 14, thereby effecting dissolution of the connection between the cable connected to cap 70 and the cable connected to piston 50.

When the release link is assembled, the force required for separation may be increased by threadedly advancing collar external threads 30 into the cylinder enlarged portion 18 internal threads 20. Similarly, the force required for separation may be reduced by threadedly moving collar 22 outwardly (leftwardly, as viewed in FIG. 1) in cylinder enlarged portion 18.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A release link for interconnecting first and second cables, said link comprising:
   a cylinder having an open cylinder first end and a cylinder aperture through a cylinder second end;
   a collar having a collar first end, a collar second end fixed to said cylinder first end, and an annular internal flange;
   a guide washer slidably disposed in said collar second end;
   a piston having a body portion extending through said cylinder aperture, a reduced diameter portion axially extending from said body portion and through said guide washer, a neck portion axially extending from said reduced diameter portion, and a tapered head portion axially extending from said neck portion, said head portion being disposed at a first end of said piston and in said collar;
   a cap connectable to said collar first end;
   balls adapted to be disposed adjacent said neck portion and radially adjacent said internal flange;
   a spring disposed in said cylinder and biasing said guide washer toward said balls;
   a first connector on said cap for attachment to the first cable; and
   a second connector on a second end of said piston for attachment to the second cable.

2. The release link in accordance with claim 1 wherein said cylinder is provided with a cylinder enlarged diameter portion at said cylinder first end.

3. The release link in accordance with claim 2 wherein said cylinder enlarged diameter portion is provided with internal threads adjacent said cylinder first end.

4. The release link in accordance with claim 3 wherein said collar second end is provided with external threads engaged with said internal threads.

5. The release link in accordance with claim 4 wherein said guide washer comprises a barrel portion and an annular flange portion, said annular flange portion being slidably movable in said collar second end.

6. The release link in accordance with claim 5 wherein said guide washer is disposed against said internal flange.

7. The release link in accordance with claim 6 wherein said head portion and said reduced diameter portion are each of larger diameter than said neck portion.

8. The release link in accordance with claim 7 wherein said head portion is provided with a tapered surface adjacent said neck portion and said reduced diameter portion is provided with a tapered surface adjacent said neck portion and opposed to said he tapered surface.

9. The release link in accordance with claim 8 wherein said collar includes threads at said collar first end and said cap includes a tubular portion threadedly connectable to internal threads of said collar.

10. The release link in accordance with claim 9 wherein said tubular portion is adapted to receive therein said head portion when said cap is connected to said collar.

11. The release link-in accordance with claim 10 wherein said balls are adapted to be disposed in a position adjacent said neck portion, said tapered surface, and said piston reduced diameter tapered surface, and said balls are movable from said position to release said piston from said collar and said cylinder.

12. The release link in accordance with claim 11 wherein said spring comprises a coil spring disposed between said annular flange portion and said cylinder second end, and around said body portion and said barrel portion.

13. The release link in accordance with claim 1 wherein said spring comprises a coil spring disposed between said guide washer and said cylinder second end.

14. The release link in accordance with claim 1 wherein said cap is threadedly connected to said collar first end.

15. The release link in accordance with claim 1 wherein said first connector comprises a hole in said cap.

16. The release link in accordance with claim 1 wherein said second connector comprises a hole in said body portion.

* * * * *